(12) United States Patent
Chang

(10) Patent No.: US 6,202,875 B1
(45) Date of Patent: Mar. 20, 2001

(54) WHISTLING DEVICE OF A COOKER LID

(76) Inventor: Min-Lan Chang, P.O. Box 82-144, Taipei (TW)

( * ) Notice: Subject to any disclaimer, the term of this patent is extended or adjusted under 35 U.S.C. 154(b) by 0 days.

(21) Appl. No.: 09/407,873

(22) Filed: Sep. 29, 1999

(51) Int. Cl.[7] ................................................. A47J 27/212
(52) U.S. Cl. ............... 220/203.21; 220/912; 116/137 R; 116/70; 99/344
(58) Field of Search ..................... 220/573.1, 202, 220/203.1, 203.21, 203.29, 203.27, 367.1, 373, 374, 912, 913; 215/311, 312; 116/137 R, 70, 266, 67 R, 264, 265, 101, 102, 103, 112; 99/342–344

(56) References Cited

U.S. PATENT DOCUMENTS

| | | | |
|---|---|---|---|
| 4,418,637 | * 12/1983 | Heermans | 116/70 |
| 4,586,455 | * 5/1986 | Shibata | 116/67 R |
| 4,690,095 | * 9/1987 | Walls et al. | 116/67 R |
| 4,776,296 | * 10/1988 | Heermans | 99/344 |
| 4,857,897 | * 8/1989 | Chen | 99/344 |
| 5,471,912 | * 12/1995 | Lin | 116/137 R |
| 6,004,000 | * 12/1999 | Hupf et al. | 99/343 |

* cited by examiner

Primary Examiner—Nathan J. Newhouse
(74) Attorney, Agent, or Firm—A & J

(57) ABSTRACT

The present invention relates to a whistling device of a cooker lid and in particular, to a handle block mounted onto a cooker lid to adjust the size of an air hole on the lid and the sound produced. A steel bead or a whistle is placed in a screw cork to produce a whistling sound and the adjustment of the handle block of the cooker lid can control the volume of the sound and the amount of hot air released from a cooker.

1 Claim, 6 Drawing Sheets

WHISTLING DEVICE OF A COOKER LID

BACKGROUND OF THE INVENTION a) Technical Field of the Invention

The present invention relates to a whistling device of a cooker lid and in particular, to a handle block mounted onto a cooker lid to adjust the size of an air hole on the lid and the sound produced. A steel bead or a whistle is placed in a screw cork to produce a whistling sound and the adjustment of the handle block of the cooker lid can control the volume of the sound and the amount of hot air released from a cooker.

b) Description of the Prior Art

Recently, various types of safety devices and alarming devices are provided to cooking utensils in order to provide safety and convenience to the user. Frequently, a whistle is provided to the cooker lid so that the hot air produced during cooking provides an alarming sound to alert the user. However, for cooker lids having a glass window, no whistling device is provided as a result of its complicated structure. There is only an air vent provided on the cooker lid. If a whistling device is to be mounted onto the glass mounted cooker lid, the structure of the whistling device may be very complicated and expensive to manufacture.

SUMMARY OF THE INVENTION

It is therefore a primary object of the present invention to provide a whistling device of a cooker lid, wherein (a) the cooker lid is circular having a center opening allowing the screw cork to pass through it and then fix to a screw hole of a protrusion at the bottom of the handle block, an annular rim at the bottom of the screw cork urges the circumference of the center opening;

(b) the screw cork has a center projection having a venting hole along the projection and at the center thereof and the outer surface of the projection is threaded such that the screw cork can pass through the center opening, two air-guiding slots are provided along the inner wall of the venting hole such that a steel bead within the venting hole will not block the venting hole but air can be released through the guiding slots, the size of the venting hole is adaptable for a steel bead or a whistle, and the steel bead is used to control the volume of sound produced by the released air from the cooker and control the time of cooking, the bottom of the screw cork is provided with an recess facilitating the mounting of the screw cork or dismantling of the screw cork, hot air is passed to a guiding hole at the lateral wall of the protrusion via the venting hole;

(c) the annular block is circular and has a circular opening, the size of the opening is adaptable for the protrusion at the bottom of the handle block, and an air hole is corresponding to the guiding hole at the lateral wall of the protrusion, the air hole aligns with an air outlet at the lateral wall of the handle block and a protruded arch is provided along the circumference of the annular block and at the top of the air hole, the arch can be mounted to an arch-shaped slot which is provided at the top of the air outlet, the arch is moveable along the arch-shaped slot to allow opening or releasing of the air outlet; and (d) a handle block has an arch-shaped handle diametrically mounted across the edge of the handle block the air outlet is provided at lateral wall of the handle block and the arch-shaped slot is provided at the top of the air outlet, such that the protruded arch can be inserted into and moveable along the slot, the protrusion is provided at the center, bottom of the handle block, and the screw hole (refer to FIG. 6) is provided to the protrusion for the mounting of the screw cork, the lateral wall of the protrusion is provided with the guiding hole and the guiding hole is corresponding to the air hole at the annular block.

It is another object of the present invention to provide a whistling device of a cooker lid which can mitigate the drawbacks of the conventional cooker lid with alarming device.

The various features of novelty which characterize the invention are pointed out with particularity in the claim annexed to and forming a part of this disclosure. For a better understanding of the invention, its operating advantages and specific objects obtained by its uses, references is made to the accompanying drawings and descriptive matter in which preferred embodiment of the invention is illustrated.

DETAILED DESCRIPTION OF THE PREFERRED EMBODIMENT

Figure 1:
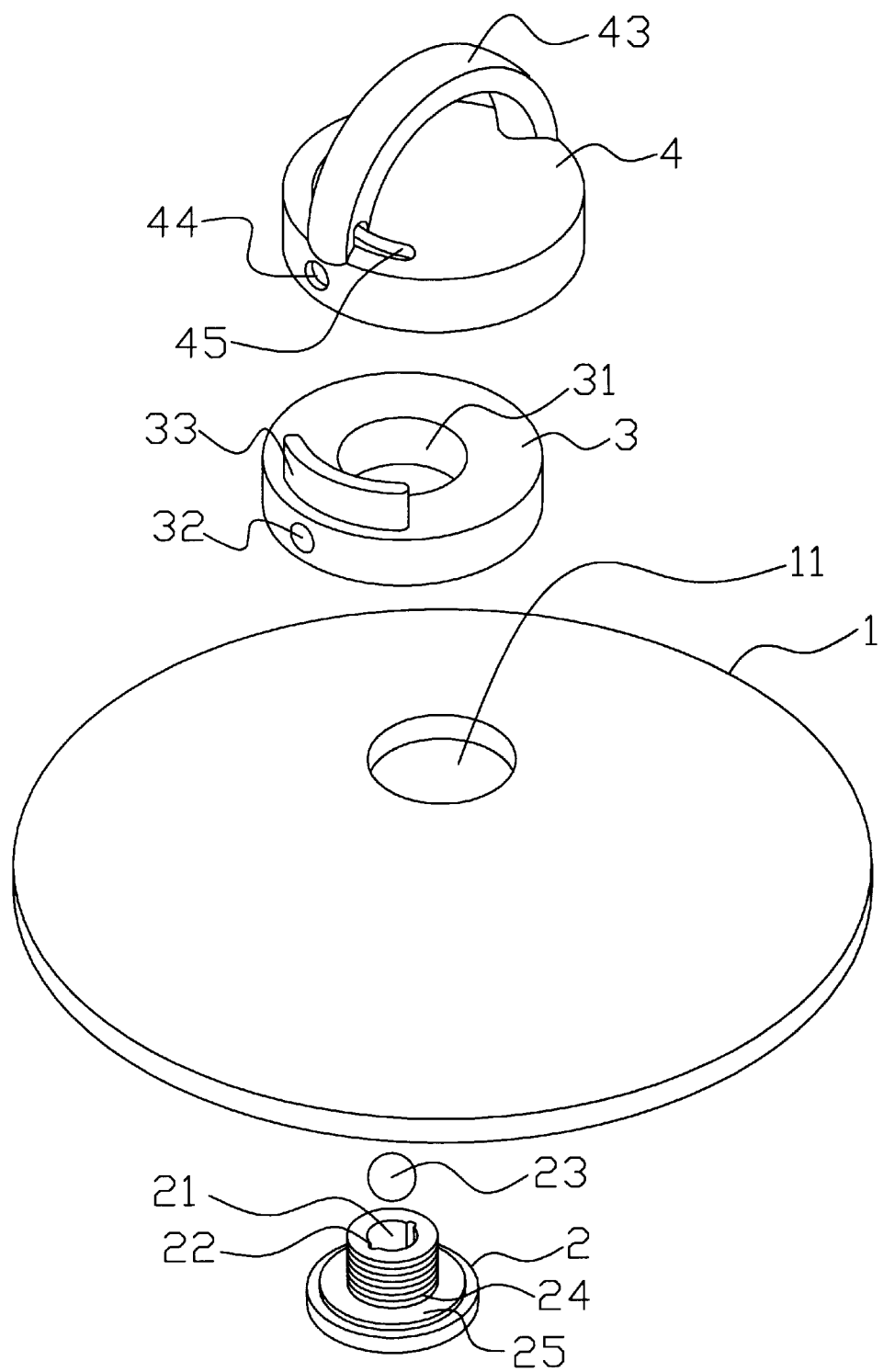
FIG. 1 is an exploded perspective view of a preferred embodiment of the present invention.
Figure 2:
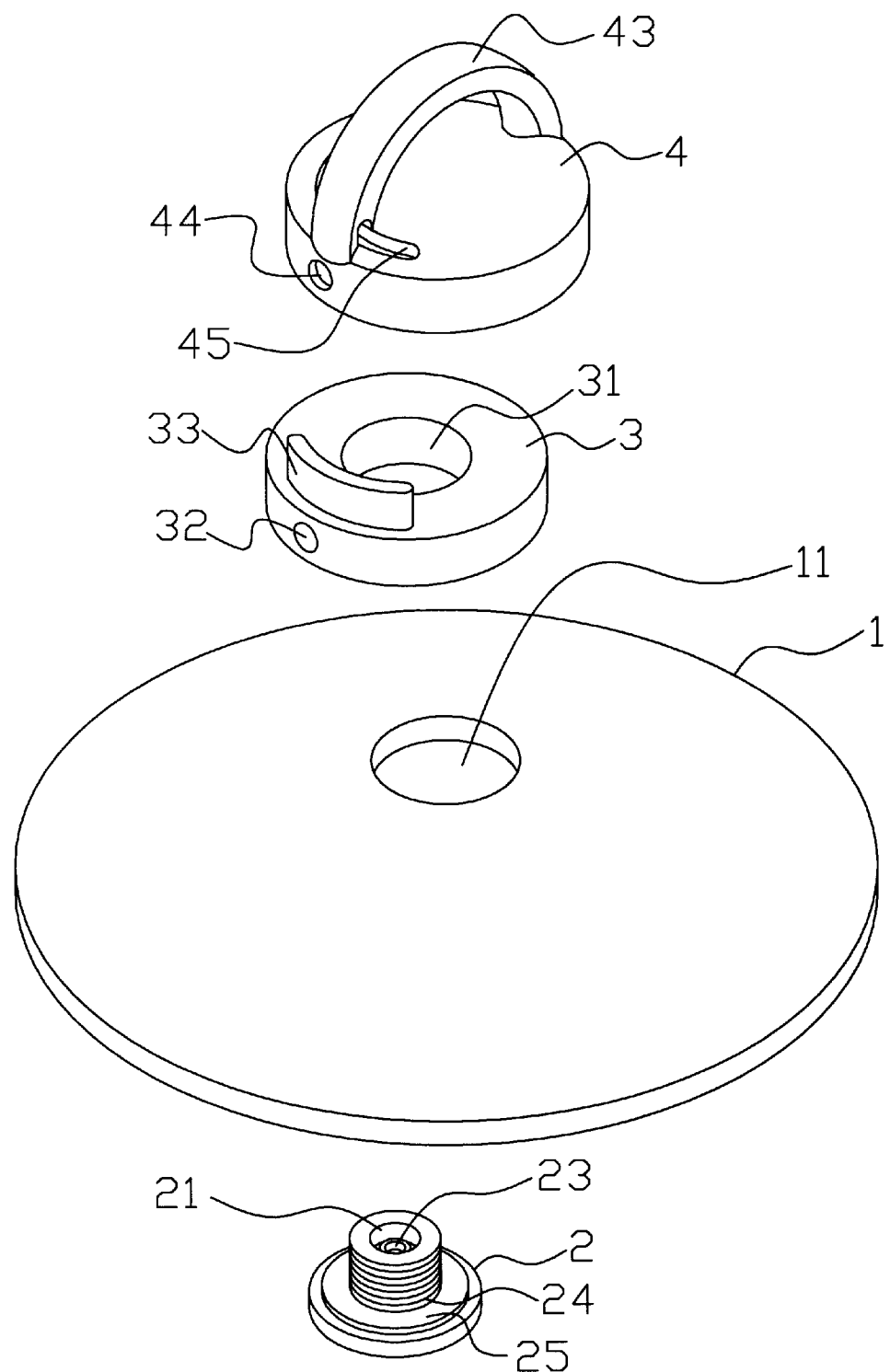
FIG. 2 is another exploded perspective view of the preferred embodiment of the present invention.
Figure 3:
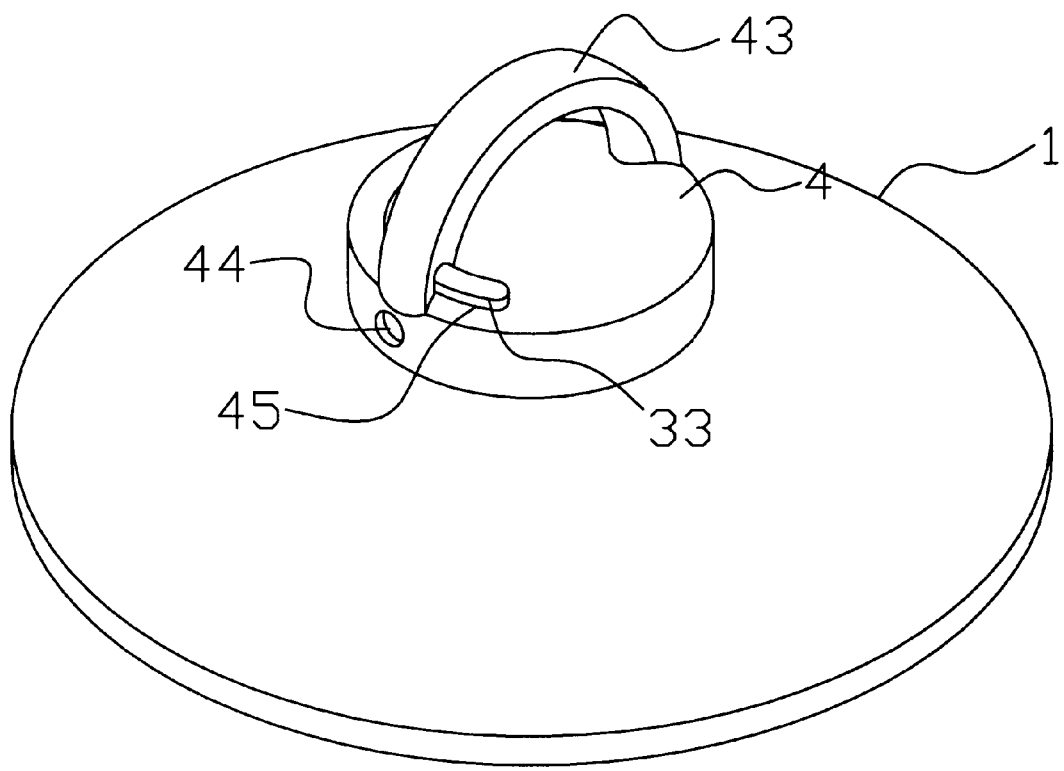
FIG. 3 is a perspective view of the preferred embodiment of the present invention.
Figure 4:
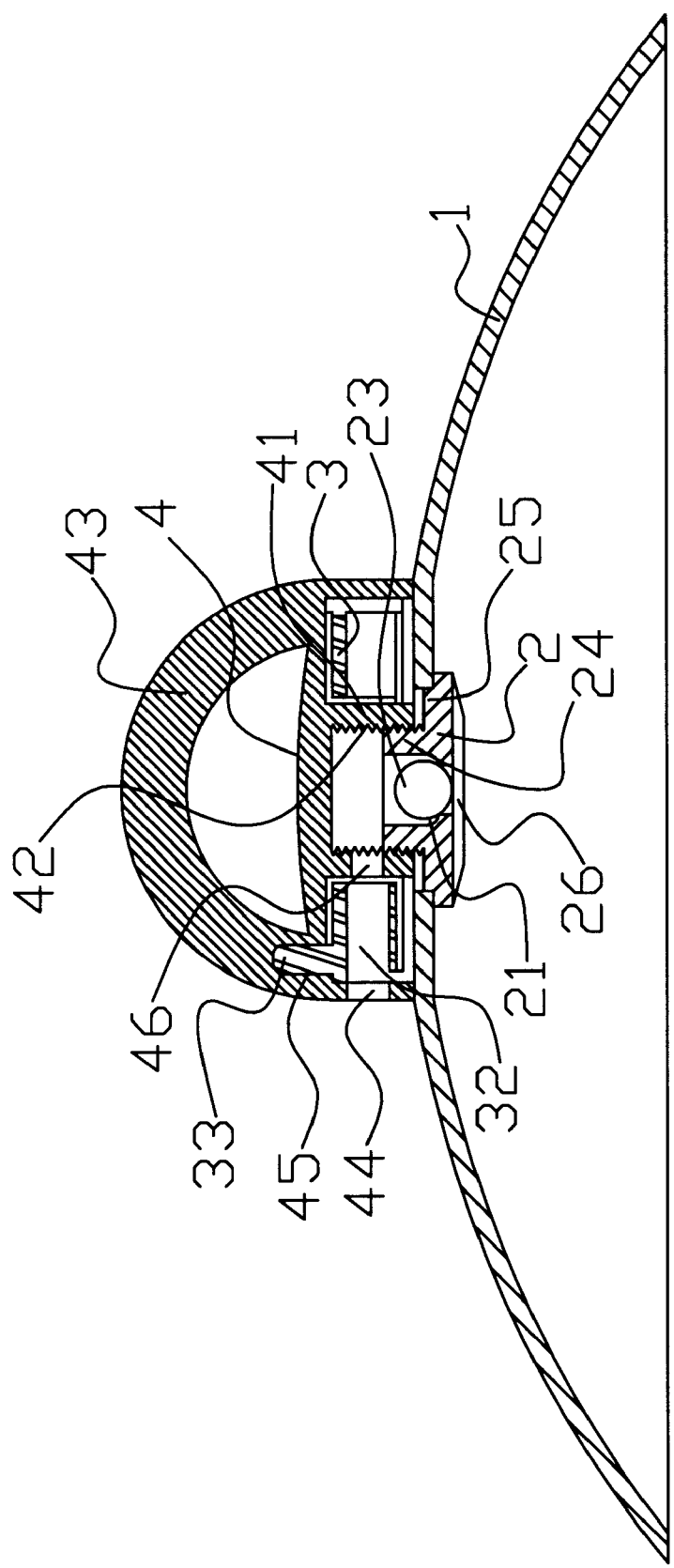
FIG. 4 is a sectional view of the preferred embodiment of the present invention.
Figure 5A:
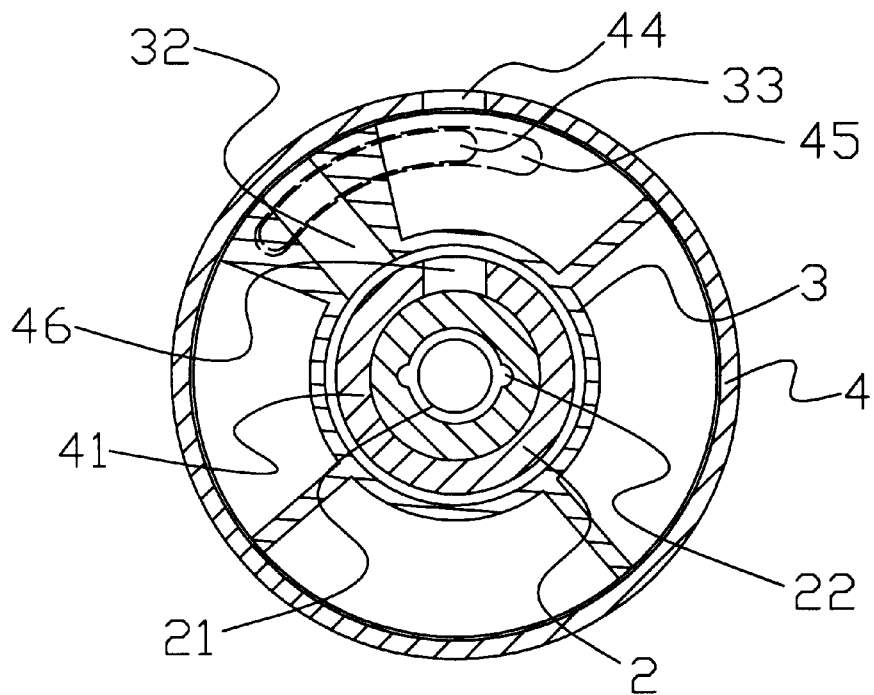
FIGS. 5A and 5B are schematic views illustrating the opening of air hole for air releasing in accordance with the present invention.
Figure 5B:
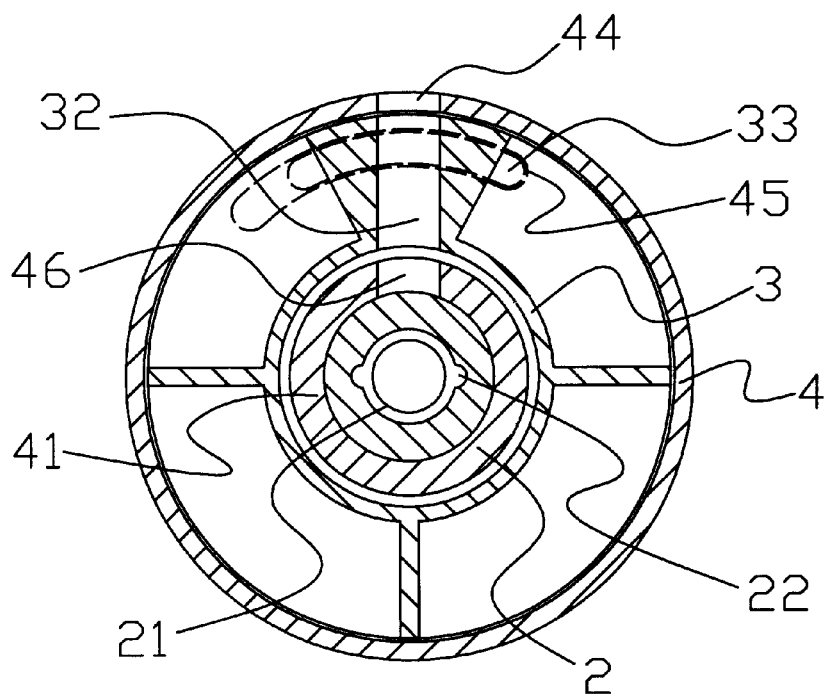

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 6:
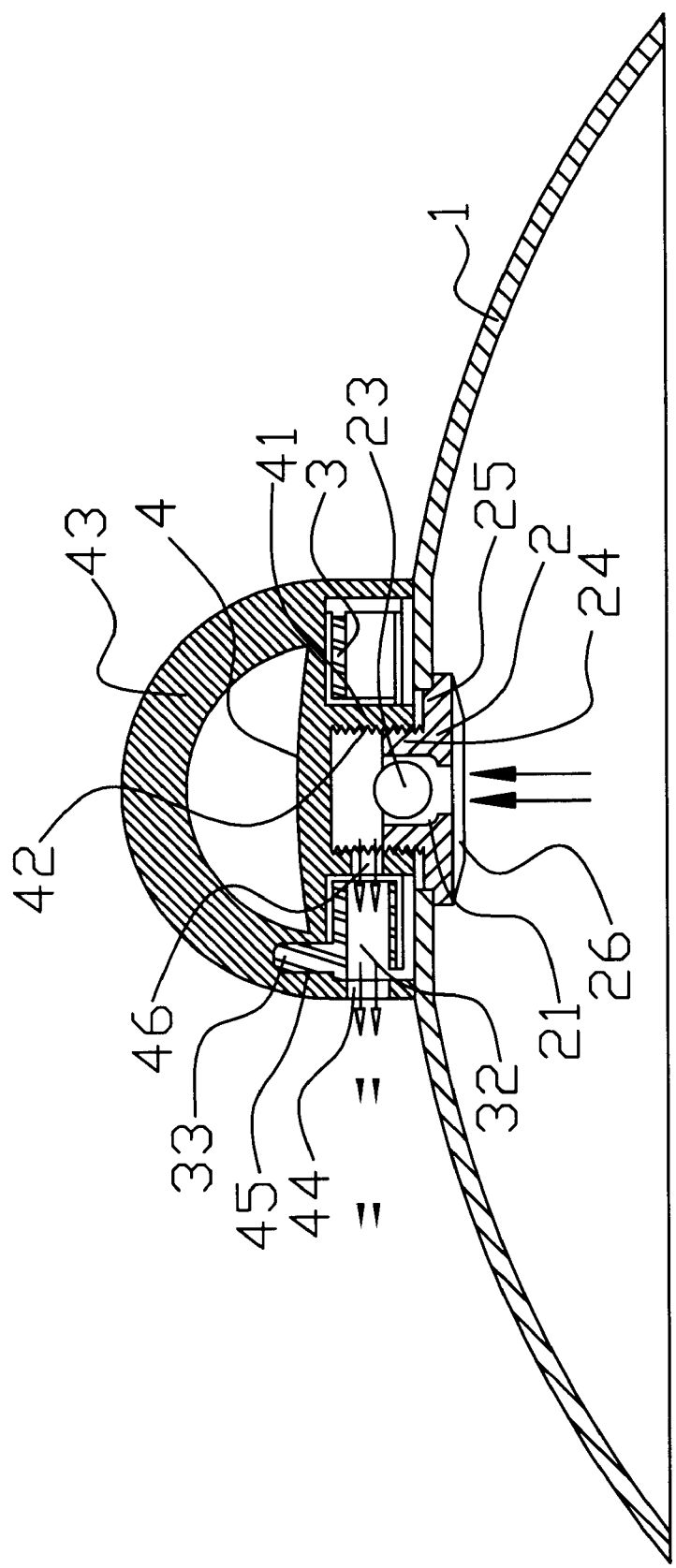
FIG. 6 is a sectional view illustrating air releasing in accordance with the present invention.

Referring to FIGS. 1, 2, 3, 4, 5A and 5B, there is shown a whistling device for a cooker comprising a cooker lid 1, a screw cork 2, an annular block 3, a handle block 4, wherein (a) the cooker lid 1 is circular having a center opening 11 allowing the screw cork 2 to pass through it and then fix to a screw hole 42 (refer to FIG. 6) of a protrusion 41 (refer FIG. 4) at the bottom of the handle block 4, an annular rim 25 at the bottom of the screw cork 2 urges the circumference of the center opening 11;

(b) the screw cork 2 has a center projection having a venting hole 21 along the projection and at the center thereof and the outer surface of the projection is threaded such that the screw cork 2 can pass through the center opening 11, two air-guiding slots 22 are provided along the inner wall of the venting hole 21 such that a steel bead 23 within the venting hole 21 will not block the venting hole 21 but air can be released through the guiding slots 22, the size of the venting hole 21 is adaptable for a steel bead or a whistle 23, and the steel bead 23 is used to control the volume of sound produced by the released air from the cooker and control the time of cooking, the bottom of the screw cork 2 is provided with an recess 26 (refer to FIG. 6) facilitating the mounting of the screw cork 2 or dismantling of the screw cork 2, hot air is passed to a guiding hole 46 (refer to FIG. 4) at the lateral wall of the protrusion 41 via the venting hole 21;

(c) the annular block 3 is circular and has a circular opening 31, the size of the opening 31 is adaptable for the protrusion 41 at the bottom of the handle block 4, and an air hole 32 is corresponding to the guiding hole 46 at the lateral wall of the protrusion 41, the air hole 32 aligns with an air outlet 44 at the lateral wall of the handle block 4 and a protruded arch 33 is provided along the circumference of the annular block 3 and at the top of the air hole 32, the arc 33 can be mounted to an arch-shaped slot 45 which is provided at the top of the air outlet 44, the arch 33 is moveable along the arch-shaped slot 45 to allow opening or releasing of the air outlet 44; and (d) a handle block 4 has an arch-shaped handle 43 diametrically mounted across the edge of the handle block 4, the air outlet 44 is provided at lateral wall of the handle block 4, and the arch-shaped slot 45 is provided at the top of the air outlet 44, such that the protruded arch 33 can be inserted into and moveable along the slot 45, the protrusion 41 is provided at the center, bottom of the handle block 4, and the screw hole 42 (refer to FIG. 6) is provided to the protrusion 41 for the mounting of the screw cork 2, the lateral wall of the protrusion 41 is provided with the guiding hole 46 and the guiding hole 46 is corresponding to the air hole 32 at the annular block 3.

In accordance with the present invention, FIGS. 3 to 6 show the combination and application of the whistling device of a cooker lid. The protrusion 41 of the handle block 4 is inserted into the circular opening 31 of the annular block 3 and the entire annular block 3 is covered by the bottom of the handle block 4. The protruded arch 33 of the annular block 3 is inserted within the arch-shaped slot 45 of the handle block 4 such that the protruded arch 33 is moveable within the arch-shaped slot 45. The air hole 32 of the annular block 3 is corresponding to the air outlet 44 of the handle block 4 and a communicating path is formed. By sliding the protruded arch 33 of the annular block 3, the amount of the air released out from the air outlet 44 of the handle block 4 can be controlled. Next, a steel bead or a whittle 23 is inserted into the venting hole 21, and the screw cork 2 is then passed through the center opening 11 of the cooker lid 1 and mounted at the screw hole 42 at the protrusion 41.

The circular rim 25 of the screw cork 2 urges against the circumferential edge of the opening 11 of the cooker lid 11, and the whittling sound of the lid 1 and the cooking time are controlled by the size of the steel bead 23 at the venting hole 21. The steel bead 23 does not block the venting hole 21 as a result of the air-guiding slots 22 at the inner wall of the venting hole 21. A whittle 23 maybe inserted at the venting hole 21 to produce a whittling sound.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A whistling device for a cooker comprising a cooker lid, a screw cork, an annular block, a handle block, characterizes in that (a) the cooker lid is circular and has a center opening allowing the screw cork to pass through it and then fix to a screw hole of a protrusion at the bottom of the handle block, an annular rim at the bottom of the screw cork is urged against the circumference of the center opening;

(b) the screw cork has a center projection having a venting hole along the projection and at the center thereof and the outer surface of the projection is threaded such that the screw cork can pass through the center opening, two air-guiding slots are provided along the inner wall of the venting hole such that a steel bead within the venting hole will not block the venting hole but air can be released through the guiding slots, the size of the venting hole is adaptable for a steel bead or a whistle, and the steel bead is used to control the volume of sound produced by the released air from the cooker and control the time of cooking, the bottom of the screw cork is provided with a recess facilitating the mounting of the screw cork or dismantling of the screw cork, hot air is passed to a guiding hole in the lateral wall of the protrusion of the handle block via the venting hole;

(c) the annular block is circular and has a circular opening, the size of the opening is adaptable for the protrusion at the bottom of the handle block, and an air hole, corresponding to the guiding hole in the lateral wall of the protrusion, aligns with an air outlet at the lateral wall of the handle block and a protruded arch is provided along the circumference of the annular block and above the air hole, the arch can be mounted to an arch-shaped slot which is provided above the air outlet, the arch is moveable along the arch-shaped slot to allow opening or releasing of the air outlet; and (d) a handle block has an arch-shaped handle diametrically mounted across the edge of the handle block, the air outlet is provided in the lateral wall of the handle block, and the arch-shaped slot is provided above the air outlet, such that the protruded arch can be inserted into and moveable along the slot, the protrusion is provided at the center, bottom of the handle block, and the screw hole is provided in the protrusion for the mounting of the screw cork, the lateral wall of the protrusion is provided with the guiding hole and the guiding hole is corresponding to the air hole in the annular block, thereby, rotating the handle block causes the air hole and the air guiding hole to be in alignment or not to be in alignment so as to control the releasing of the hot air from the cooker, and the whistling device employs the steel bead to control the whistling sound and the cooking time.

* * * * *